United States Patent
Hall et al.

(10) Patent No.: US 9,595,185 B1
(45) Date of Patent: Mar. 14, 2017

(54) USER IDENTIFYING TOILET APPARATUS

(71) Applicants: David R. Hall, Provo, UT (US); Dan Allen, Springville, UT (US); Ben Swenson, Lehi, UT (US); Joshua Larsen, Spanish Fork, UT (US); Jared Reynolds, Pleasant Grove, UT (US)

(72) Inventors: David R. Hall, Provo, UT (US); Dan Allen, Springville, UT (US); Ben Swenson, Lehi, UT (US); Joshua Larsen, Spanish Fork, UT (US); Jared Reynolds, Pleasant Grove, UT (US)

( * ) Notice: Subject to any disclaimer, the term of this patent is extended or adjusted under 35 U.S.C. 154(b) by 0 days.

(21) Appl. No.: 15/150,797

(22) Filed: May 10, 2016

(51) Int. Cl.
| | |
|---|---|
| G08B 19/00 | (2006.01) |
| G08B 29/20 | (2006.01) |
| E03D 5/10 | (2006.01) |
| A47K 13/30 | (2006.01) |
| E03D 9/00 | (2006.01) |
| A47K 13/10 | (2006.01) |
| G01G 19/50 | (2006.01) |
| G01G 19/52 | (2006.01) |
| G08B 3/10 | (2006.01) |

(52) U.S. Cl.
CPC .............. *G08B 29/20* (2013.01); *A47K 13/10* (2013.01); *A47K 13/305* (2013.01); *E03D 5/10* (2013.01); *E03D 9/00* (2013.01); *G01G 19/50* (2013.01); *G01G 19/52* (2013.01); *G08B 3/10* (2013.01)

(58) Field of Classification Search
CPC ...... G08B 29/20; A47K 13/10; A47K 13/306; E03D 5/10
USPC ...... 340/506, 539.14, 539.1, 540, 545.2, 5.8, 340/5.82, 573.1
See application file for complete search history.

(56) References Cited

U.S. PATENT DOCUMENTS

| | | | | |
|---|---|---|---|---|
| 4,697,656 | A * | 10/1987 | de Canecaude | G01G 19/44 177/144 |
| 6,077,222 | A * | 6/2000 | Lloyd | A61B 5/1073 600/300 |
| 2006/0155175 | A1* | 7/2006 | Ogino | A61B 5/02438 600/301 |
| 2010/0170722 | A1* | 7/2010 | Maeda | B60N 2/002 177/136 |
| 2010/0205727 | A1* | 8/2010 | Muhlhausen | E03D 9/032 4/223 |
| 2015/0342575 | A1* | 12/2015 | Hall | A61B 10/007 600/573 |
| 2016/0374619 | A1* | 12/2016 | Borkholder | A61B 5/6891 600/301 |

* cited by examiner

*Primary Examiner* — Daryl Pope (57) ABSTRACT

A toilet apparatus for providing automatic user identification is provided. The automatic identification uses a combination of an instrumented toilet seat and an instrumented foot scale to provide user specific identification data. User health trends may be saved and reported based on the automatic user identification. User identification also allows preconfigured toilet control settings to be loaded into memory upon user identification.

20 Claims, 10 Drawing Sheets

USER IDENTIFYING TOILET APPARATUS

BACKGROUND

Field of the Invention

This invention relates to methods and systems for identifying users while using a toilet.

Background of the Invention

Modern toilets are being produced and developed with more functionality and options than toilets of the past. However, customization of toilet functionality and options based on automatic identification of a user does not exist today. The innovation addresses the issue of automatic identification of a toilet user.

SUMMARY

To address the issue of automatic identification of a toilet user a toilet provides a foot scale, a scale in the seat, electrodes in the seat and data for user identification and classification. The data used for classification may include a weight determined from the combination of the foot scale, a ratio of the weight measured in the footstool to the seat (and equivalent combinations of those variables), a bio-impedance measured by the seat (especially useful to distinguish similarly weighted male and female), a user ECG signature, a weight distribution front to back on the seat, an electrical tissue impedance, a heart rate, and a time of day or time of use.

The weight distribution in the foot scale may also determine whether a user is facing forward or backward. For forward standing users (male) the seat may be raised automatically for standing urination.

Feedback about automatically determined user identity may be displayed on the foot scale, or via an accompanying tablet, transmission to user device such as a smart phone, a wall projection, a 3D projection, a light color indication on the toilet exterior or bowl or an audio signal from a speaker, such as voice welcoming the user, a signature tone, useful for blind users, or reported to a cloud based service.

User classification, a separate process, acts on the classification data inputs. Classification can occur on a data processor in the toilet or remotely. The classification can take into consideration the trending values for each user, which is important for growing users like children or people making changes to their health and biometric measurements such as losing or gaining weight.

In the event the classification does not produce a result with high confidence the toilet can simply skip logging the data for that user, or allow the user to assign or associate that data at a later time using a mobile device access program, for instance.

The toilet may also adjust settings to a user's preferences based on a determined user identity, such as seat temperature, bidet settings, flush settings, display settings, voice feedback settings, voice recognition settings, background sound settings, health indicator settings, health trend reporting settings, user interface settings, etc.

The foot scale or footstool reports data for determining weight and front/back weight distribution.

The toilet seat with reports data for determining weight and front to back weight distribution.

The toilet seat and/or foot scale with electrodes reports user bioimpedance, electrocardiogram, electrical tissue impedance, skin resistance or other electrical impedance parameters.

A combination of foot scale weight, seat weight and their relative distributions (including front-to-back weight ratio for the seat) may be used for user identification. Additionally, the combination of weight along with bio-impedance may be used for determination of a user identification. Front to back weight distribution on the foot stool may be used to determine which way a user is facing.

Dynamic values of both weight and bio-impedance may be used to create a user identifying signature based on the way a person sits or stands while using a toilet.

A toilet apparatus for providing automatic user identification is provided. The automatic identification uses a combination of an instrumented toilet seat and an instrumented foot scale to provide user specific identification data. User health trends may be saved and reported based on the automatic user identification. User identification also allows preconfigured toilet control settings to be loaded into memory upon user identification.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, may be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings.

Figure 1:
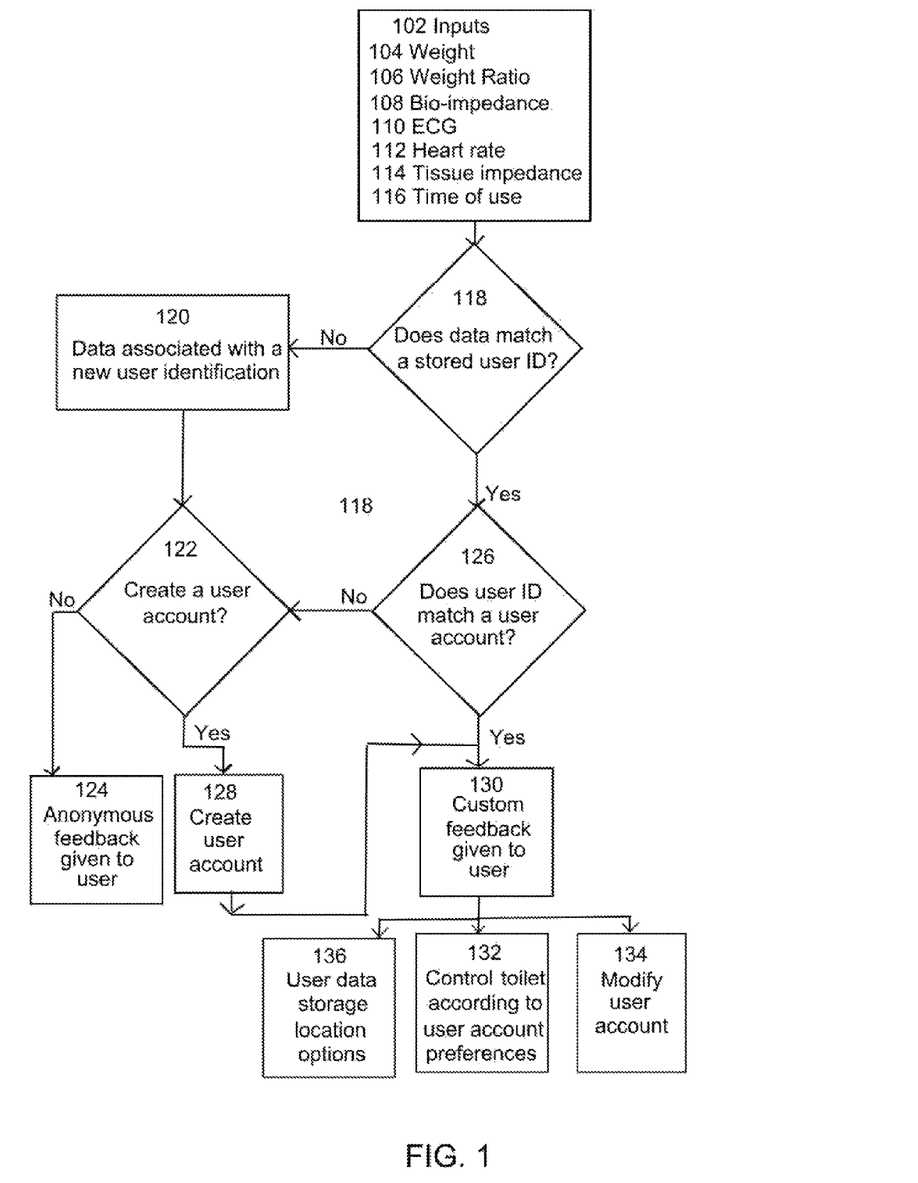
FIG. 1 is a functional block diagram of a toilet apparatus in accordance with an embodiment of the invention.

FIG. 1 is a functional block diagram of inputs and outputs of a toilet apparatus in accordance with an embodiment of the current invention. Inputs 102 of the toilet apparatus may include weight 104, weight ratio 106, bio-impedance 108, electrocardiogram (ECG) 110, weight distribution 112, tissue impedance 114, heart rate 116, time of day or time of use 118, voice recognition, fingerprint reading, and optical detection.

Weight 104 may include a total weight measured by a toilet seat. Weight may include a total weight measured by a toilet foot scale. Weight 104 may include a total weight measured by both of the toilet seat and the toilet foot scale. When a user sits on a toilet seat a weight may be detected by one or more pressure transducers fixed to the toilet seat and by one or more pressure transducers fixed to the toilet foot scale. The pressure transducers may be strain gauge weight measurement sensors, or other well-known pressure transducer sensors such as resistive weight sensors, capacitive weight sensors, inductive weight sensors, piezoelectric weight sensors, etc. Weight measurements may also be taken continuously, forming a weight signature with respect to time, while a user is using a toilet. For example, while a user is wiping his or her weight may change from one side of the seat to the other or may shift from the toilet seat to the toilet foot scale. A weight signature may indicate average times of toilet use, total weight at a toilet seat, total weight at a toilet foot scale, and wiping weight pattern distributions with respect to time at both the toilet seat and the toilet foot scale. A total weight may also be able to determine whether a user is standing or sitting based on a detected weight on the toilet seat and the toilet foot scale.

Weight ratio 106 may include a weight ratio pattern between multiple pressure transducer weight sensors on the toilet seat. Weight ratio 106 may include a weight ratio pattern between multiple pressure transducer weight sensors on the toilet foot scale. For example, side-to-side and front-to-back and side-to-back weight ratios may be used to create user signatures for both the toilet seat and for the foot scale. A combination of ratios between the toilet seat and the foot scale may also be used to form user identification signatures. A front to back weight ratio may be able to determine if a user is facing forward or backwards while standing on the foot scale.

Bio-impedance 108 or tissue impedance 114 may be obtained using one or more electrodes on the toilet seat and the toilet foot scale. The bio-impedance or tissue impedance 114 measurements may include sweeping a range of frequencies and amplitudes or may use select frequencies and amplitudes associated with user profile data. The measurements may be between multiple electrodes on a toilet seat, multiple electrodes on a foot scale, between electrodes on the toilet seat and electrodes on the foot scale, or a combination thereof. Bio-impedance signatures may be associated with user identification data.

An electrocardiogram (ECG) 110 may be obtained using toilet seat electrodes and foot scale electrodes. The ECG may be used associated with user identification data. A heart rate 112 may be obtained by using toilet seat electrodes or by using foot scale electrodes of a combination thereof. The heart rate data may be associated with user identification data.

Time of use data may be obtained as a user is using a toilet. The time of use data may be recorded in memory along with each of the other inputs 102 relative to real-time sensor data readings as a user is using a toilet. From the time of use data and the sensor data 102, user identification signature data sets may be obtained and recorded in memory.

The time of (toilet) use data may include date and time of day data along with a length of time and sensor reading times of each sensor 102. Sensors may be read on a continuous bases or at a clock cycle or sampling rate. Sensor data along versus time of sensor reading may be used to generate identification signatures of toilet users. Frequency versus sensor data may also be used to generate identification signatures of toilet users.

At step 118, the data is obtained from a user and a determination is made if it matches an existing stored user identification. The determination may be based on locally stored data or remotely stored data. Locally stored data may include data in a local memory in the toilet or in a user device. Remotely stored data may include data stored on a user device or in a cloud database over the Internet. If no match is found a new data record is formed and the user is assigned an anonymous user identification unknown to the user. If the user identification is found, then the newly generated toilet data is associated with the existing user identification. User identification data may contain sensor calibration values associated with the user. For instance, if a user is identified more easily by a user weight greater than 200 pounds on the toilet seat, processing calibration values or sensor weighting factors may be prioritized over other data gathered for user identity of a specific individual. Classification of individuals into weighted filtering categories based on sensor data reading may allow greater accuracy and speed of identification of users. If the user has an account associated with their identification 126, then custom feedback 130 may be given to the user. If not, the user may be may be asked if he or she wants to create a user account 122. The custom feedback may include access to modify the user's account 134 or options for controlling the toilet 132, or options for user data storage locations 136. A user account may include user name, email address, doctor, phone number, date of birth, online health record access, home address, height, weight, blood pressure, heart rate, etc. A user identification may be a subset of information found within a user account. The user identification or data associated with the user identification may be used to calibrate sensors or processor determination steps. The user may be classified into a calibration category based on the user inputted data. User account preferences may include all of the data associated with a user identification including trending health charts and records, weight history, frequency of urination, frequency of bowel movements, sounds associated with toilet use, voice feedback settings, foot scale heater settings, bidet settings, toilet seat heater settings, flush settings, display settings, user interface settings, and reporting of data settings. User storage location options 136 may include selections for reporting data to an email address, to a website address, to a doctor's office, to a central health system, to a cloud based software service, or to a combination thereof.

If a toilet user desires to not have an account 122 and remain anonymous 124 then user data is still recorded but the user only receives limited toilet functionality and data options. The user identification 120 is still created and any new data is associated with this user identification when the user reused the toilet, but user account functionality is limited. The user's anonymous data may be used for statistical reporting and research studies of medical conditions. When a user uses the toilet for the first time, an automatic association of user's data with a file name or random alphanumeric number may take place. Then, if the same user uses the toilet again in the future the toilet may recognize the user by stored identification data and inform the user that he or she has lost 5 pounds in the last six months (or since last use of the toilet). If the user has used the toilet in the past the toilet may associate the new data with the old data and inform the user of any changes or trends related to weight, heart rate, health or hydration status.

Custom feedback 130 may include options on screen at the toilet such as access to a bidet, options for music or video, options for connection of a user device, etc as setup within user account settings of a user account.

Figure 2:
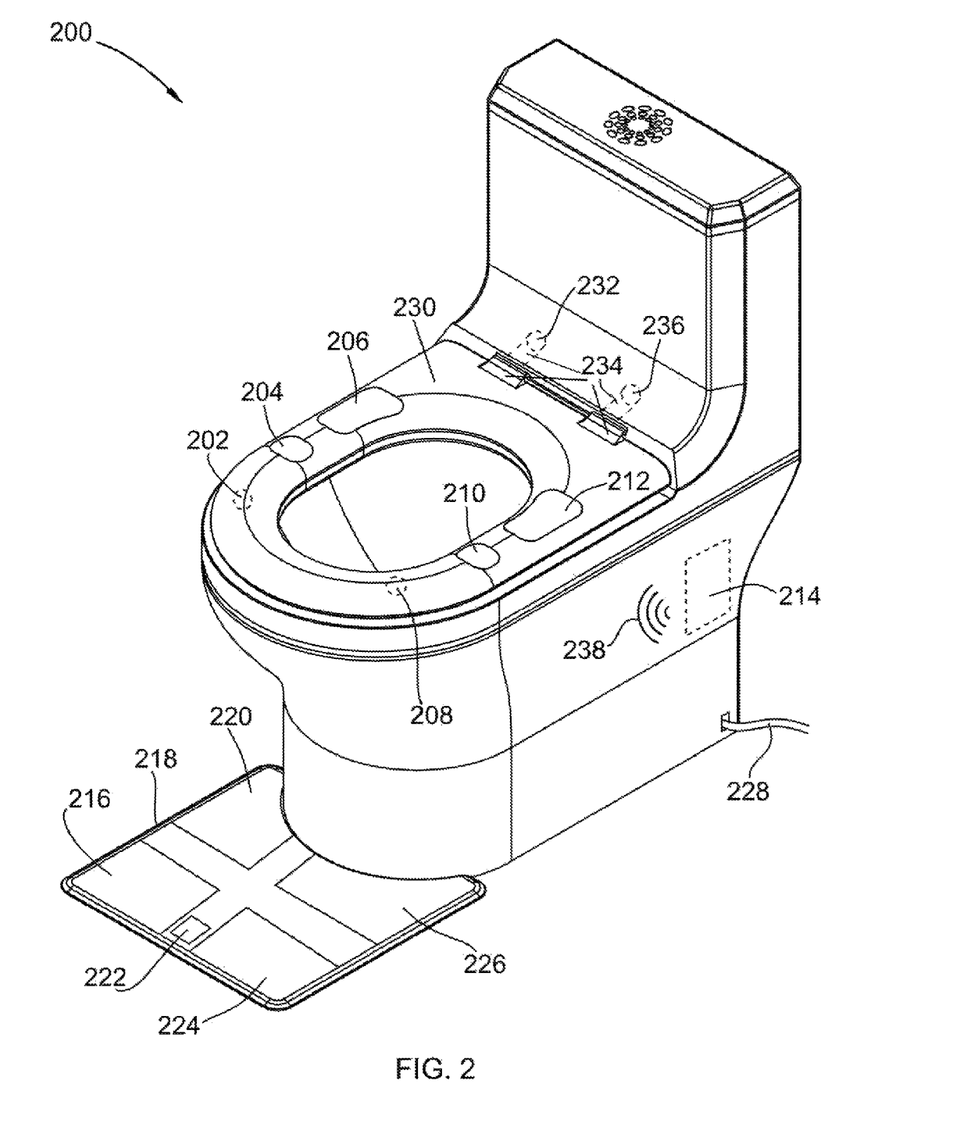
FIG. 2 is an isometric view of an embodiment of a toilet apparatus in accordance with an embodiment of the invention.

FIG. 2 shows a toilet 200 with a first plurality of strain gauge pressure transducers 202, 208, 232 and 236 attached to toilet seat 230. A first plurality of electrodes 204, 206, 210, and 212 are also attached to toilet seat 230. A processor 214 may communicate wirelessly or by wire with foot scale 218, toilet seat 230, and a network or Internet server (not shown). A first processor may be used in the toilet shown at 214, a second processor may be used within the foot scale 218 and a third processor may be used within the toilet seat 230. Separate memory may be associated with each of the processors and may be located with the processors. Each of the processors may also have a communication port for communicating wirelessly or by a wired connection. The toilet seat 230, the foot scale 218 or the processor 214 may be battery powered or powered by a wired wall type connection. Toilet 200 may be powered by cord 228 which may supply high or low voltage to the toilet 200. Foot scale 218 has electrodes 216, 220, 226, and 224 attached to a top portion of the foot scale in each of the corners. The electrode configuration of the foot scale allows a user's foot to contact multiple electrodes while using the toilet.

Figure 3:
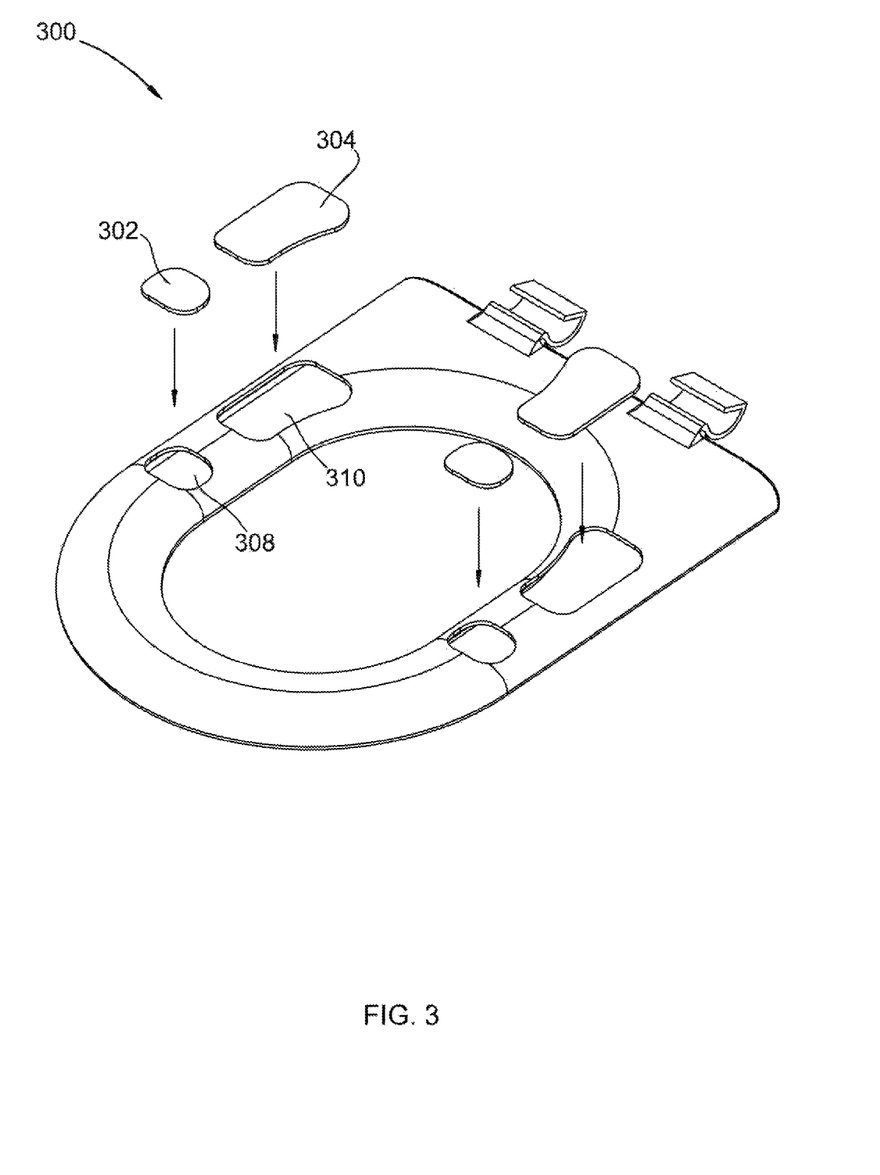
FIG. 3 is an exploded view of a toilet seat of a toilet apparatus in accordance with an embodiment of the invention.

In FIG. 3 a toilet seat 300 is shown with some of the components detached from the seat. The electrodes 302 and 304 shown are placed on a surface 308 and 310 of the toilet seat so as to contact a user's skin while the user is sitting on the toilet seat.

Figure 4:
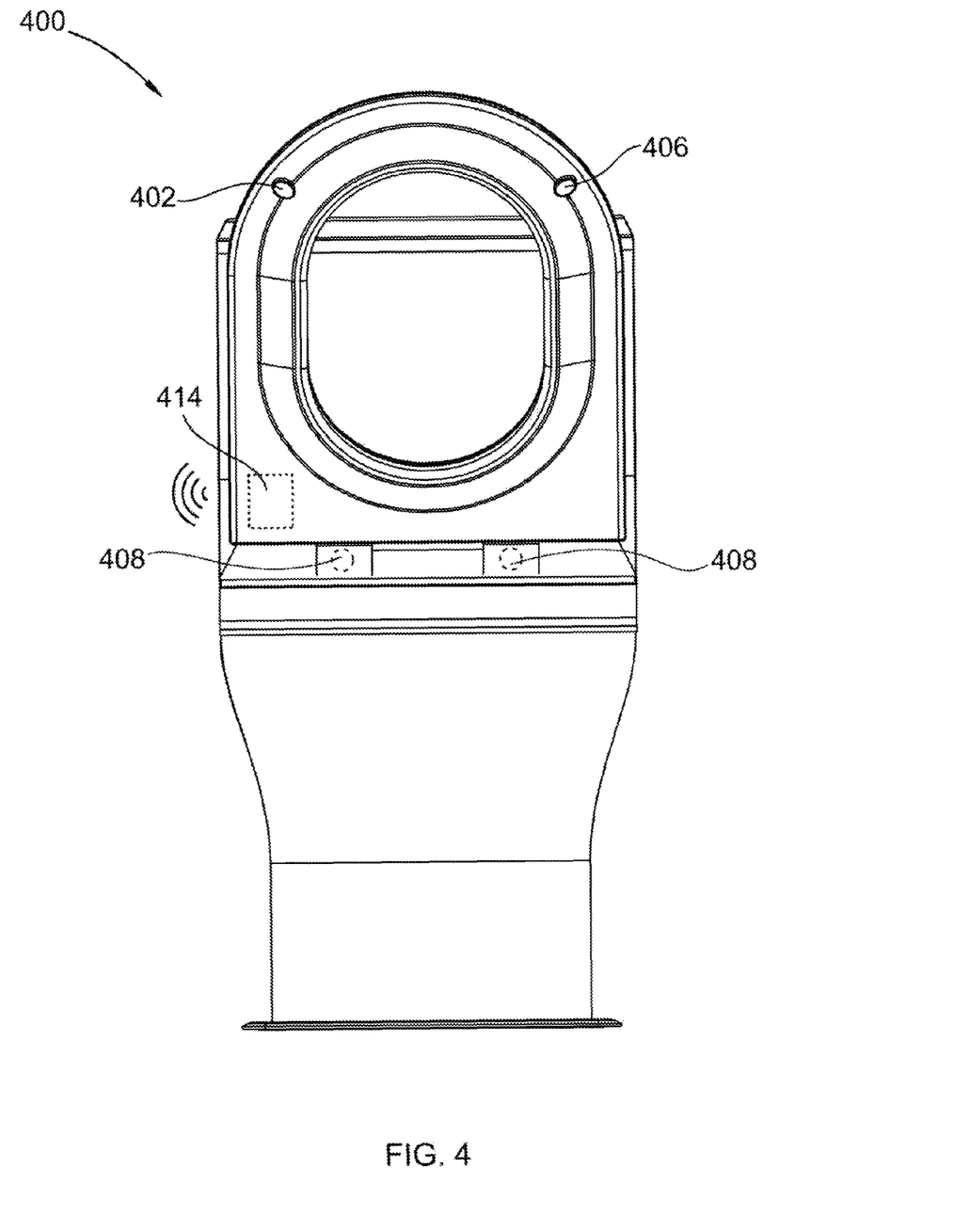
FIG. 4 is a bottom view of a toilet seat of a toilet apparatus in accordance with an embodiment of the invention.

FIG. 4 shows a bottom side of a toilet seat with a wireless processor 414 with connects with the electrodes on the top side of the toilet seat and strain gauges 408, and 402 and 406. Processor 414 may wirelessly report toilet seat sensor data to a different processor located on the toilet or to another remote processor such as a server.

Figure 5:
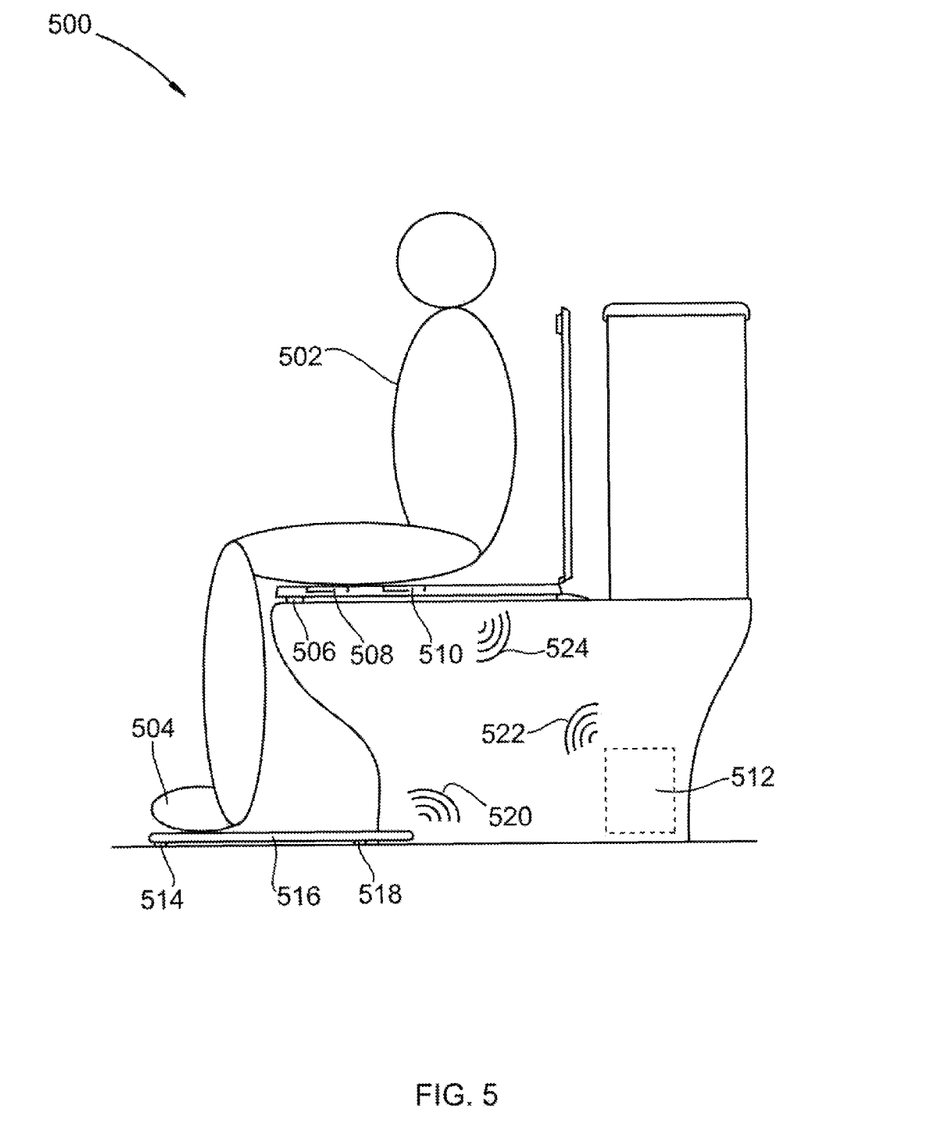
FIG. 5 is a side view of a toilet apparatus in accordance with an embodiment of the invention.

FIG. 5 shows a user 502 sitting on a toilet with his feet 504 resting on a toilet foot scale 516. The weight of the user's legs and feet cause strain gauges 514 and 518 to register weight data to processor 512. The toilet seat sends strain gauge data and electrode data 524 to processor 512 for processing. The data may be wired or wireless. User 502 was automatically identified by weight ratios and bio-impedance values transmitted over the internet to a remote cloud based service. The cloud based service then redirected processor 512 to a health database server where user has health account. The user's health account then updated the user health data with the recently obtained heart rate, ECG, hydration status, and weight and then asked the user if he wants to have the information reviewed by a physician or suggests that he have the information reviewed by a physician based on the data results. Toilet setting may have also been loaded into the toilet for controlling the toilet.

Figure 6:
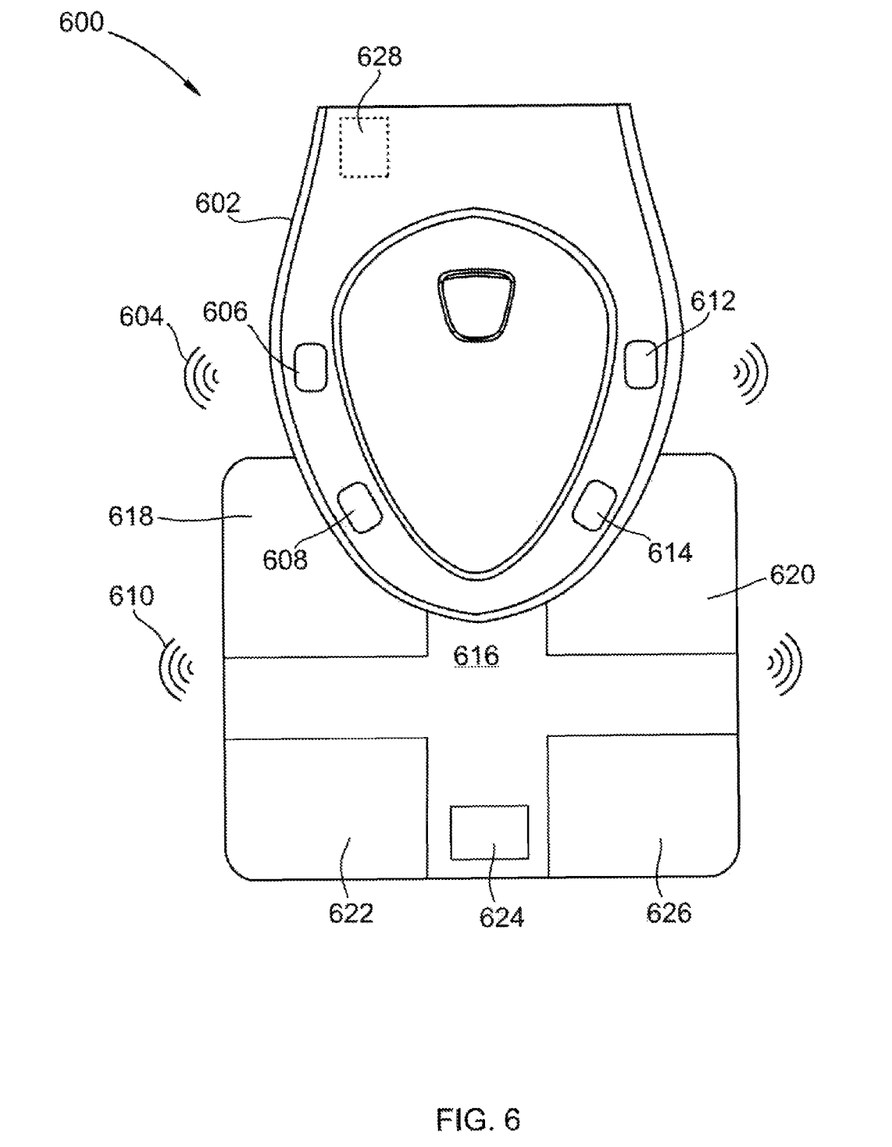
FIG. 6 is top view of a toilet apparatus in accordance with an embodiment of the invention.

FIG. 6 shows top view of the toilet 600. The foot scale 616 includes a display 624 for giving communicating with a user. Electrodes 606, 608, 612, 614, 618, 620, 622, and 626 communicate bio-impedance or tissue impedance signals 610 and 604 to processor 628.

Figure 7A:
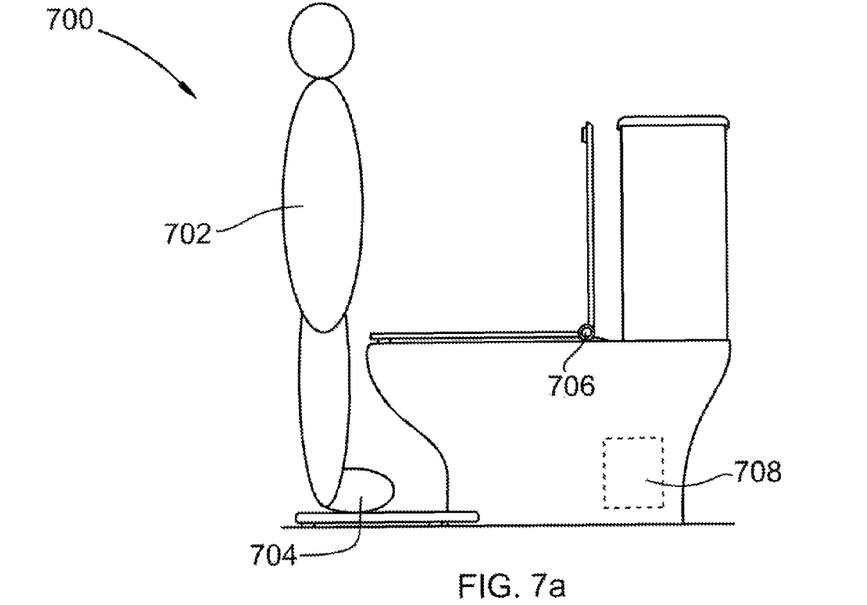
FIGS. 7a and 7b are a side views of a toilet apparatus in accordance with an embodiment of the invention.
Figure 7B:
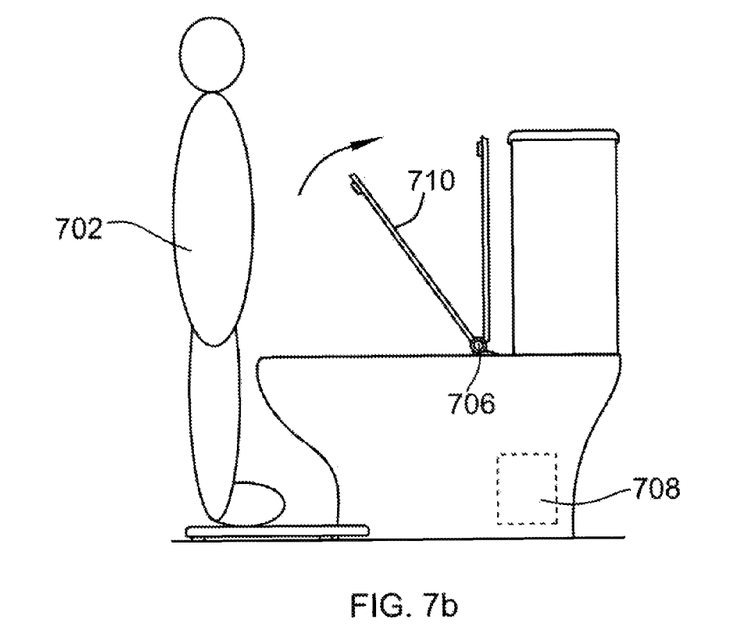

In FIGS. 7a and 7b, a user 702 is standing facing a toilet. The processor 708 recognizes the user by his weight and also recognizes that the user's weight distribution ratio on the foot scale and determines that the user's preferences are setup to automatically lift the toilet seat when the user stands facing the toilet for a predetermined amount of time or gives a voice command while facing the toilet for the seat to raise up 710. This feature is helpful to users who are unable to bend over or who have back problems. Hinge 706 may be a motorized hinge and able to lift on command by the user or by automatic processor instructions.

Figure 8:
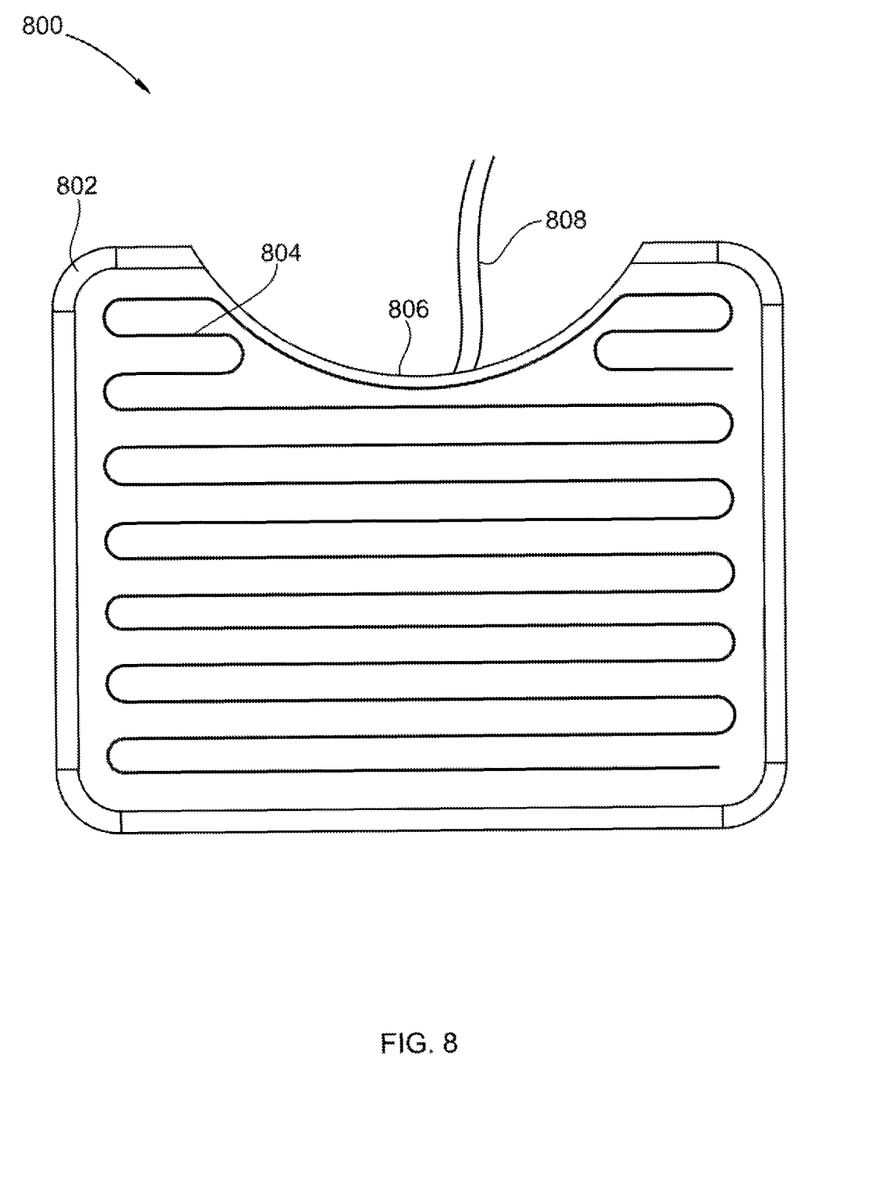
FIG. 8 is a bottom view of a toilet foot scale in accordance with an embodiment of the invention.

In FIG. 8, we see a heater 804 which is attached to a bottom side or inner side of foot scale 802. The electrodes may be located on an opposite side of foot scale 802. The heater may be configured by a user and automatically turned on and set to a user's predetermined settings based on the toilet recognizing the user. The heater may by powered by a wired connection 808. Wired connection 808 may be connected the toilet or to another wired power source.

Figure 9:
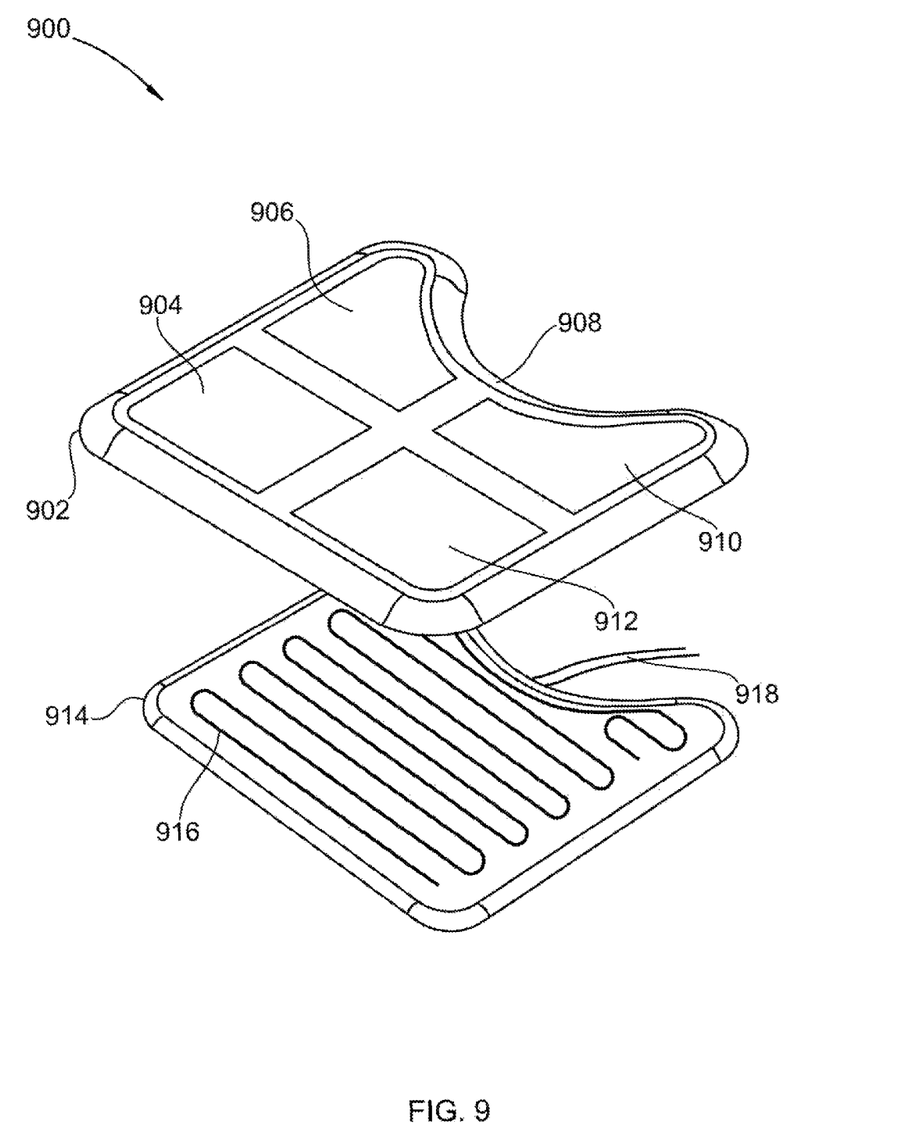
FIG. 9 is an exploded view of a toilet foot scale in accordance with an embodiment of the invention.

FIG. 9 shows an exploded view of foot scale 900. Electrodes 904, 906, 910, and 912 are shown and the strain gauges are hidden from view. Heater 916 is shown located between a base section 914 and a top section 902 of the foot scale. Power cord 918 is shown located at a toilet interface 908 of the foot scale.

Figure 10:
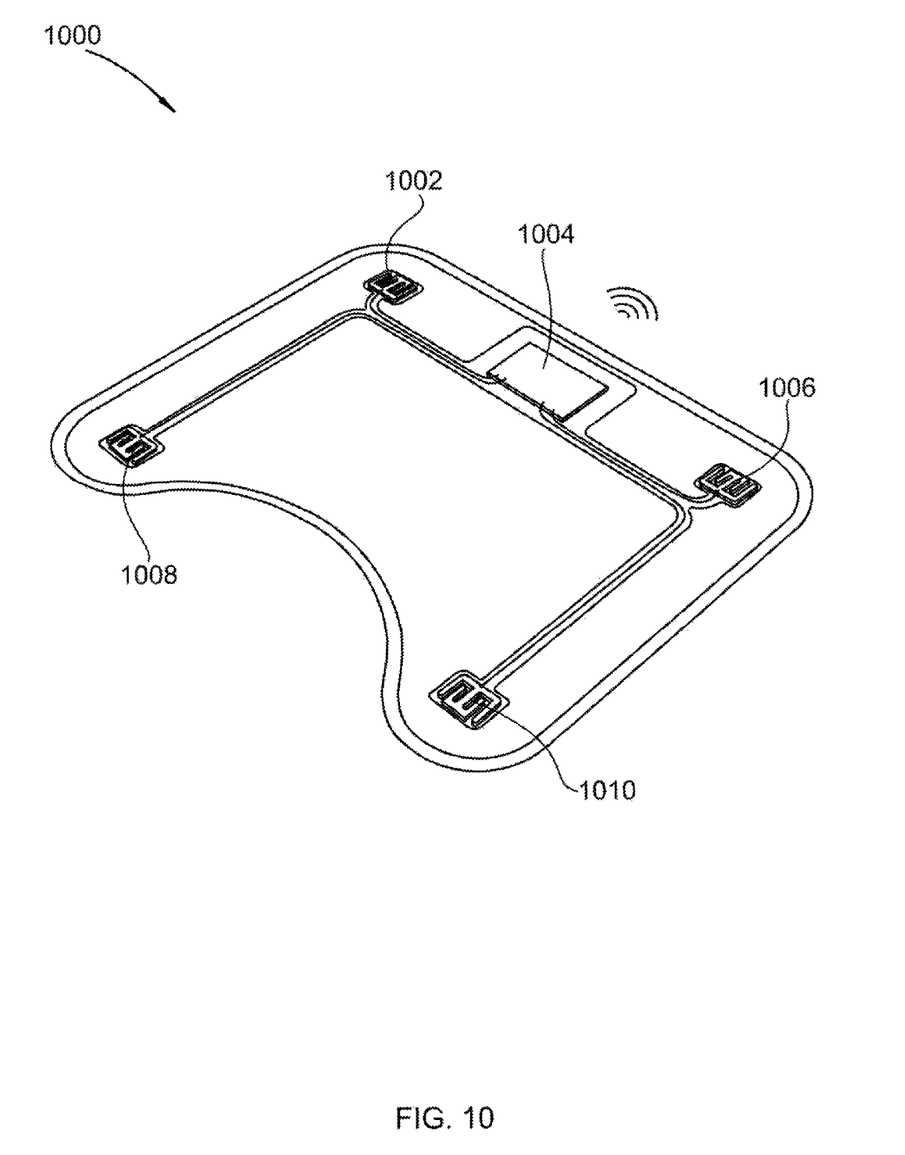
FIG. 10 is a bottom view of a top portion of a toilet foot scale in accordance with the invention.

FIG. 10 shows a bottom side of the foot scale with for strain sensors 1002, 1006, 1008, and 1010 located at opposite corners of the foot scale. The foot scale 1000 also shows a processor 1004 connected to each of the strain sensors.

The toilet apparatus and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A toilet apparatus comprising:
   a first plurality of strain sensors fixed to a toilet seat of the toilet apparatus, the toilet seat located above a bowl of the toilet apparatus;
   a second plurality of strain sensors fixed to a toilet foot scale, the toilet foot scale being located below the bowl of the toilet apparatus;
   a first plurality of electrodes on a surface of the toilet seat for reading bio-impedance;
   a second plurality of electrodes on a surface of the toilet foot scale for reading bio-impedance;
   memory for tracking and storing data produced by the first plurality of strain sensors, the second plurality of strain sensors, the first plurality of electrodes, the second plurality of electrodes, and a time of use of the toilet apparatus;
   one or more communication ports for bidirectional wireless or wired communication;
   one or more processors for determining a user identity based on the stored data while the user is using the toilet apparatus; and
   wherein the user identity is used to control or calibrate the toilet apparatus, the first plurality of strain sensors, the second plurality of strain sensors, the one or more electrodes on the surface of the toilet seat, the one or more electrodes on the surface of the toilet foot scale, or a physical location of the stored data.

2. The toilet apparatus of claim 1, wherein the first plurality of strain sensors includes at least two strain gauge sensors attached to hinges of the toilet seat and at least two strain gauge sensors attached to a bottom side of the toilet seat.

3. The toilet apparatus of claim 1, wherein the stored data comprises four or more of: a weight, a weight ratio, a weight distribution, a bio-impedance, an electrocardiogram, a tissue impedance, a heart rate, or a time of use.

4. The toilet apparatus of claim 1, wherein the physical location is one or more of: a memory location in a wireless device, a memory location in a database server, or a memory location in the toilet apparatus.

5. The toilet apparatus of claim 3, wherein the first plurality of strain sensors are used to determine the weight ratio or the weight distribution.

6. The toilet apparatus of claim 3, wherein the second plurality of strain sensors are used to determine the weight ratio or the weight distribution.

7. The toilet apparatus of claim 3, wherein a combination of the first plurality of strain sensors and the second plurality of strain sensors are used to determine the weight ratio and the weight distribution.

8. The toilet apparatus of claim 1, wherein the user identity is used to control the toilet apparatus according to one or more user preferences.

9. The toilet apparatus of claim 8, wherein the one or more user preferences include at least one of: heater settings, flush settings, display settings, or user interface settings.

10. The toilet apparatus of claim 9, wherein the user interface settings include one or more of: voice feedback settings, voice recognition settings, background sound settings, health indicator settings, or health trend reporting settings.

11. The toilet apparatus of claim 10, wherein the health trend reporting settings are configured to audibly report to the user weight trends each time the user is identified by the toilet apparatus.

12. The toilet apparatus of claim 10, wherein the background sound settings are configured to obtain music from a wireless user device.

13. The toilet apparatus of claim 10, wherein a cloud based music service is accessed based on the user identification.

14. The toilet apparatus of claim 1, wherein the first plurality of strain sensors and the one or more electrodes are connected to a first processor, a first wireless communication port, and a first memory within the toilet seat.

15. The toilet apparatus of claim 1, wherein the second plurality of strain sensors and the one or more electrodes are connected to a second processor, a second wireless communication port, and a second memory within the foot scale.

16. The toilet apparatus of claim 1, wherein first plurality of electrodes are used to determine at least two of: a tissue impedance, an electrocardiogram, or a bio-impedance.

17. The toilet apparatus of claim 1, wherein second plurality of electrodes are used to determine at least two of: a tissue impedance, an electrocardiogram, or a bio-impedance.

18. The toilet apparatus of claim 3, wherein a combination of the first plurality of electrodes and the second plurality of electrodes are used to determine the tissue impedance, the electrocardiogram, and the bio-impedance.

19. The toilet apparatus of claim 1, wherein the user identification is used to calibrate one of: the first plurality of strain sensors, the second plurality of strain sensors, the first plurality of electrodes, or the second plurality of electrodes.

20. The toilet apparatus of claim 1, wherein the toilet apparatus is powered by one or more batteries, wired power sources or a combination thereof.

\* \* \* \* \*